United States Patent

[11] 3,575,429

| [72] | Inventor | Thomas G. Spofford |
| --- | --- | --- |
| | | Union Township, Union County, N.J. |
| [21] | Appl. No. | 720,129 |
| [22] | Filed | Apr. 10, 1968 |
| [45] | Patented | Apr. 20, 1971 |
| [73] | Assignee | The Thomas & Betts Co. |
| | | Elizabeth, N.J. |

[54] ELECTRICAL CONNECTOR SEALING RING
1 Claim, 8 Drawing Figs.

[52] U.S. Cl. .................................................. 277/166,
277/182
[51] Int. Cl. ...................................................... F16j 15/06
[50] Field of Search .......................................... 277/166,
181—184, 235

[56] References Cited
UNITED STATES PATENTS

| 2,637,606 | 5/1953 | Pielop, Jr. ..................... | 277/235X |
| 2,852,291 | 9/1958 | Hults ........................... | 277/235X |
| 2,966,539 | 12/1960 | Sears et al. .................... | 277/235X |

FOREIGN PATENTS

| 836,509 | 6/1960 | Great Britain ................ | 277/181 |
| 906,958 | 9/1962 | Great Britain ................ | 277/235 |

Primary Examiner—Laverne D. Geiger
Assistant Examiner—Robert I. Smith
Attorney—David Teschner ABSTRACT: The disclosure is directed to various constructions of unitary, two-material sealing rings for preventing the entrance of moisture into protective electrical housings. These sealing rings are composed of an outer metallic ring made of steel, or other similar material, and an inner ring composed of a flexible material such as rubber. In first embodiments of the ring; the flexible inner ring is molded directly upon, into and about the metal outer ring. In other embodiments the metal outer ring and flexible inner ring are formed as separate units and then combined by deformation of the metal outer ring in order to form a unitary, two-material sealing ring. In the first-noted form, various configurations of an inwardly extending portion of the metal ring are provided, such as to trap, hold and lock into place the flexible ring which is formed into, and about, the metal ring. In the embodiments of the ring wherein separate outer rings and inner rings are formed, special shapes of the sidewalls of the respective rings are created such that upon deformation of the sidewall, of the outer metallic ring, the seizing and locking of the inner ring is accomplished.

Patented April 20, 1971  3,575,429

INVENTOR.
THOMAS G. SPOFFORD
BY David Tescline

ATTORNEY

ELECTRICAL CONNECTOR SEALING RING

BACKGROUND OF THE INVENTION

1. Field of the Invention

The invention is directed to the field of providing protective sealing devices for the entrance into protective electrical housings of conduit, raceways and other similar devices. The device is similarly adaptable to any other situation where it is desired to provide a moisture barrier at a coupling between two elements, such as a pipe and a valve, or similar devices.

2. Description of the Prior Art

In order to secure a raceway, conduit, flexible tubing or the like to an electrical distribution box, fittings are employed which have at a first end thereof, a locking nut for connecting the fitting to the conduit, raceway or other device. Adjacent the locking nut is a shoulder arranged to engage the sidewalls about the knockout of an electrical box. A conical section of the fitting extends within the electrical box to provide a continuous path for conductors placed within the conduit, or raceway, to enter the electrical box. Fittings of this type, as found in the prior art, are generally of die-cast zinc with cast threads, or they may be sand-cast iron with cut threads, sand-cast aluminum with cut threads, machined steel with cut threads or formed steel with rolled threads. In each of these instances, the shoulder which would engage the outer wall of the box about the knockout through which the fitting enters the electrical box is generally rough and does not form a flat, smooth contact with such wall. The reason for this discontinuity, or imperfection of the shoulder surface, is the manner of manufacture and cutting of the screw threads. For example, there may be parting lines, due to the particular casting technique employed, or there may be die stop marks on the shoulder as a result of the thread-cutting operations. Expensive finishing of the shoulder in order to insure a flat, continuous, smooth surface is not warranted under most conditions because the fitting is equally applicable to couplings which do not require moisture seals as they are to those that do require moisture seals.

In order to adapt fittings found in the prior art to provide a moisture barrier type of coupling for electrical boxes, it is necessary that a sealing ring be employed between the shoulder of the fitting of the wall of the electrical box. If it is known that the particular fitting is to be employed for a liquidtight seal then a relief groove may be provided between the front face of the shoulder and the conical portion of the fitting which enters the electrical box. A retaining ring, generally an annular ring with slight inturned outer shoulders, may be positioned adjacent the shoulder and an O-ring, of rubber or other flexible material, will be stretchedly placed over the conical section and allowed to relax taking a position within the relief groove. With the provision of such a relief groove and the use of an O-ring it is possible to achieve a reasonably good moisture seal. However, such an arrangement requires first that the fitting have a relief groove and secondly that a two-part sealing ring, that is an O-ring and a retaining ring be made available in proper size to accommodate the fitting. When attempts are made to use this particular arrangement of retaining ring and O-ring with a fitting not having a relief groove, a poor moisture barrier is provided between the conduit and the electrical box. This is due to the absence of a relief groove into which the O-ring may be forced during tightening of the fitting to the box. The shapes generally taken by these O-rings when deformed during the connecting operation provide leak paths for moisture to enter about the retaining ring 80 and past the O-ring and into the electrical box. Further, in both instances, whether a relief groove was present, or not, the ring itself provides no limitation upon the tightening which may be achieved in locking the raceway to the electrical box. Overtightening of the coupling could cause rupture of the O-ring itself or a distortion to so great an extent as to provide leakage paths either directly through the O-ring itself, or thereabouts, to permit moisture to enter the electrical box.

SUMMARY OF THE INVENTION

The present invention seeks to overcome the difficulties noted above with respect to prior-art sealing rings by providing a sealing ring whose operation is independent of the availability of a relief groove in the conduit fitting and which will operate equally well with fittings having relief grooves and those not provided with such relief grooves. Additionally, due to the manner of formation of the sealing ring, a metal spacer is effectively provided between the shoulder of the fitting and the outer wall of the electrical box to which the fitting is to be coupled whereby proper tightening of the connector with respect to the electrical box can be achieved without destruction of the flexible ring portion of the sealing ring. The sealing ring is constructed, in first embodiments, by performing an outer metallic ring having a sidewall of a predetermined height such that it will permit the desired spacing between the shoulder of the fitting and the wall of the electrical box. One edge of the outer metal ring terminates in an inwardly directed flange portion which may extend in any direction perpendicular to the sidewall or had an inclined or declined angle thereto. Additionally, the end of the inturned flange may also be continued in a further flange extending either downwardly or extending downwardly and inclined back towards the sidewall. In each of these instances a cavity is formed between the flanges and the sidewall to facilitate the locking of the flexible inner sealing ring. Once the outer ring has been fabricated, the inner ring may be molded directly thereto employing a flexible material such as rubber. By means of the cavities formed within the metal outer ring, the inner rubber ring will be firmly locked to the metal outer ring preventing separation of the component parts and providing a unitary two-material sealing ring. In other embodiments of the device the inturned flange of the metal outer ring may be provided with various perforation patterns so that locking action is achieved by the continuity of the inner flexible material about and through the flange of the metal outer ring. In a further embodiment of the device the metal outer ring and the flexible inner ring are formed in two separate component parts and are later coupled together. To facilitate this, the outer wall of the rubber inner ring is fabricated with an inclined surface such that the outer wall of the metal outer ring may be deformed to capture the rubber inner ring within it. In each of the embodiments, the presence of the metal outer ring, having a predetermined height, will control the degree of closeness which may be achieved between the wall of the electrical box and the shoulder of the fitting thereby preventing fracture or the formation of leakage paths by overtightening of the fitting with respect to the electrical box wall. Additionally, although the sealing ring is formed of two materials the manner of formation is such that it will create a unitary sealing ring and obviate the necessity for carrying two component parts such as the retaining ring and the O-ring as is found in the prior art. A further detail of the formation of the sealing rings is such as to provide an extension beyond the predetermined heights of the outer ring, of the rubber inner ring, above and beyond the metal ring surface to provide a rubber pad to engage the surface of the electrical box to permit maximum contact and coupling between the sealing ring and the box and further in extending in contact with the shoulder again to provide maximum contact with said shoulder and to provide for the best possible seal at the point of contact between the sealing ring and the fitting. It is therefore an object of this invention to provide an improved form of sealing ring usable with fittings available in the prior art.

It is another object of this invention to provide the unitary two-material sealing ring wherein the inner ring extends beyond the surfaces of the outer metal ring and provides maximum sealing with the shoulder of the associated fitting and associated electrical box.

It is still another object of this invention to provide a sealing ring having a metallic outer ring which limits the degree of tightening which may be applied to the connector whereby maximum sealing is permitted without destruction of the sealing ring.

It is yet another object of this invention to provide a unitary, two-material sealing ring which obviates the necessity for employment of two separate parts as is found in the prior art.

It is yet another object of this invention to provide an improved sealing ring which is unitary and composed of two materials; the first material being a metallic outer ring formed in a shape to provide locking action with respect to the inner ring and providing the molding of the inner ring to the preformed outer ring to assure unitary construction.

It is still another object of this invention to provide a metallic outer ring which has inturned flanges provided with various perforation patterns to permit an inner ring to be molded about said outer ring and extending through the perforation pattern of said outer ring whereby said inner and outer rings are locked to one another.

It is yet another object of this invention to provide a unitary two-material sealing ring wherein the metallic outer ring and flexible inner ring are fabricated as separate elements and are formed into a unitary member by the distortion of the outer wall of the metallic outer ring.

Other objects and features of the invention will be pointed out in the following description and claims and illustrated in the accompanying drawings which disclose, by way of example, the principles of the invention and the best modes which have been contemplated for carrying them out.

BRIEF DESCRIPTION OF THE DRAWINGS

In the drawings.

Similar elements are given similar reference characters in each of the respective figures.

DESCRIPTION OF THE PREFERRED EMBODIMENTS

Figure 1:
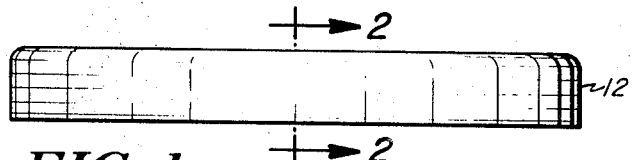
FIG. 1 is a side elevation of the metallic outer ring of a sealing ring constructed in accordance with the concepts of the invention.
Figure 2:
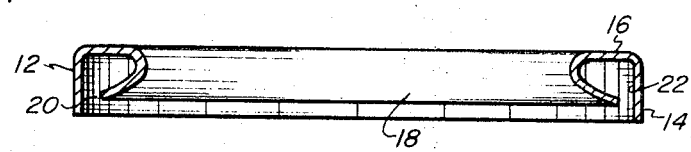
FIG. 2 is a side elevation of the metallic outer ring of the sealing ring of FIG. 1 taken along the lines 2–2.
Figure 3:
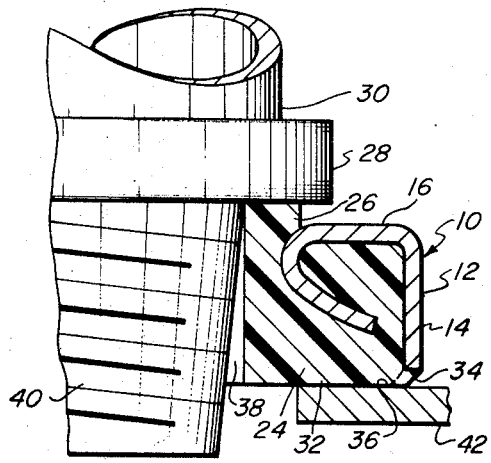
FIG. 3 is a side elevation of a fragmentary portion of the metallic outer ring of FIG. 1 with a rubber inner ring assembled to it, showing the sealing ring in contact with a conduit fitting and an electrical box.

Turning now to FIGS. 1, 2 and 3 there is shown a first embodiment of a sealing ring 10 constructed in accordance with the concepts of the invention. Sealing ring 10 has an outer metal ring 12 which is generally circular in shape and continuous and is formed with rounded edges at the bottom and top of the ring. As is shown in FIG. 2, the sidewall 14 of the ring 12 terminates at a first edge thereof, in an inwardly turned flange portion 16 which further terminates in a downwardly turned flange 18 which is inclined towards the sidewall 14. A passage 20 is provided between the inner surface of the sidewall 14 and the downwardly extending flange 18. Formed between the inner surface of the sidewall 14 and the lower surfaces of the inturned flange 16 and the downwardly extending flange 18 is a partially enclosed cavity 22. The outer metal ring may be fabricated from steel or any other similar material providing the requisite stiffness. After the metal ring 12 has been formed the inner ring 24, (see FIG. 3) composed of a flexible material, such as rubber, will be molded into and about the metal ring 12. This inner ring 24 is fabricated in such a manner as to extend within the cavity 22 and fill it. Further, the inner ring will extend through the passage 20 and will extend about the downturned flange 18. The inner ring 24 will also have a lip portion 26 which extends above the outer surface of the flange 16, which lip portion 26 will engage the shoulder 28 of a conduit fitting 30. Inner ring 24 will also extend below the sidewall 14 to provide a rubber contact surface 32 for engagement with the wall of the electrical box to which the ring is coupled. The inner ring 24 will have an edge 34 which forms a smooth transition between the bottom edge of the ring 24 and the outer surface of the sidewall 14 of the metal ring 12, which also protects the bottom edge of the sidewall 14. Alternatively, inner ring 24 may be terminated with an edge such as 36 shown in dotted line which is inclined between the ring 24 and the bottom edge of the inner surface of the sidewall 14 of the outer ring 12. The inner ring 24 extends beyond the metal ring 12 into the aperture 38 of the outer ring 12. In this manner the threads 40 of the fitting 30 are protected against abrasion and destruction during the insertion of the fitting 30 through the sealing ring 10.

Figure 4:
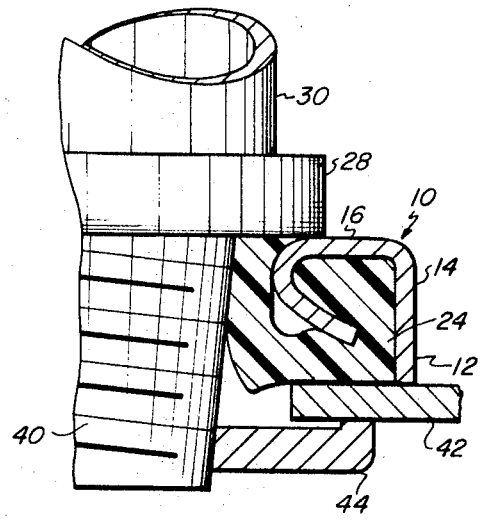
FIG. 4 is similar to FIG. 3 but shows the effects of tightening the fitting upon the sealing ring.

FIG. 3, shows the sidewall 42 of an electrical box and shows the positioning of the sealing ring 10 adjacent a knockout within said sidewall 42 and the positioning of the fitting 30 within the sealing ring 10 and entering the electrical box. This is the condition and position of the respective elements prior to the application of a nut (not shown) to the screw threads 40 of the fitting 30 to lock the fitting 30 to the electrical box. Turning to FIG. 4, there is shown the elements of FIG. 3 in the condition in which they would exist once a nut 44 had been tightened upon the screw threads 40, of the fitting 30, to affix the fitting 30 to the electrical box. As can be seen in the FIG., the spacing between the shoulder 28 and the wall 42 of the electrical box is controlled by the height of the sidewall 14 of the sealing ring 10. In the tightened position the shoulder 28 will rest upon the inwardly turned flange 16. Tightening will cause some distortion of the inner ring 24 so as to seal the spacing between the threaded portion 40 of the fitting 30 and the aperture 38 of the metal ring 12. The particular distortion characteristics of the inner ring 24 can be controlled to a large degree by the selection of the flexible material, by controlling its thickness and height with respect to the metal ring.

Figure 8:
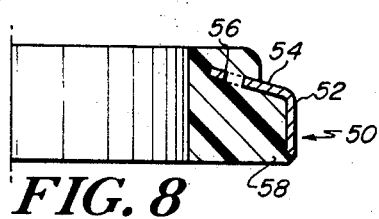
FIG. 8 is a side elevation, in section, of a portion of a further embodiment of a sealing ring constructed in accordance with the concepts of the invention.

Turning now to FIG. 8, an alternative embodiment of the device of FIG. 1 is shown. In this arrangement, sealing ring 50 is composed of an outer metal ring 52, having an inclined inwardly extending flange 54, having a plurality of perforations 56 therein. The perforations 56 may be circular, fully enclosed within the flange 54 or may be punched at the edge thereof in various shapes. In addition, the material removed to provide the perforations may be left on the flange 54 in a folded back arrangement to provide additional grasping of the inner ring which will be formed thereupon. Once the outer ring 52 has been fabricated an inner ring 58 of flexible material, such as rubber, will be fabricated by molding thereabout with a portion of the material of the ring 58 allowed to extend through the apertures or perforations 56 within the flange 54 thus providing a continuous material coupling and providing for the requisite locking of the inner ring 58 with respect to the outer ring 52.

Figure 5:
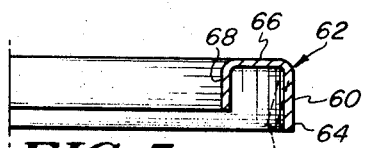
FIGS. 5, 6 and 7 are side elevations, in section, of a portion of a further embodiment of a sealing ring constructed in accordance with the concepts of the invention.
Figure 6:
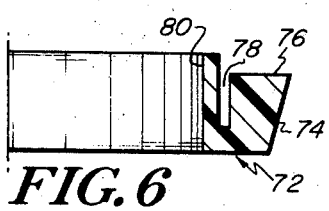
Figure 7:
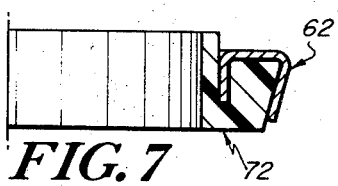

Turning now to FIGS. 5, 6 and 7 another alternative arrangement of a unitary sealing ring composed of two materials is shown. Sealing ring 62 has an outer ring 60 having a sidewall 64 and inturned flange 66, generally perpendicular with sidewall 64, and a downwardly extending flange 68, generally parallel with sidewall 64. Sidewall 64 is arranged to be deformed from the position shown in the solid line to the position shown in the dotted line as at 70. A separate inner ring 72 is fabricated from a material such as rubber or any other similar flexible material. Ring 22 has an inclined outer sidewall 74, a horizontal top wall 76, an annular groove 78 for receipt therein of the downwardly extending flange 68 of the outer ring 62. Further, there is a lip extension portion 80 arranged to fit on the outer surface of the downwardly extending flange 68 and provide a seal between the outer ring 60 and the threaded portion of the fitting. In order to assemble the outer ring 60 and the inner ring 72, the inner ring 72 is positioned within the outer ring 60 such that the downwardly extending flange 68 enters the annular groove 78. The sidewall 64 of the outer ring 60 is then deformed from the position shown in solid line in FIG. 5 to the position 70, shown in dotted line in FIG. 5. In this manner the inner ring 72 is mechanically locked to the outer ring 60 forming sealing ring 62.

The operation of the alternative embodiments as shown in FIGS. 5 through 8 is similar to that shown with respect to FIG. 4 in that the distortion of the inner rings 58 and 72 respectively, will be such as to provide a seal between the shoulder of the fitting with which the ring is to be employed and the threaded portion thereof to prevent the entrance of moisture about said fitting into the electrical box.

While particular forms, and shaped of the outer and inner rings have been chosen for the purpose of illustration it should be evident that sealing rings, in other than circular form, may be employed without departing from the spirit of the invention.

While there have been shown and described and pointed out the fundamental novel features of the invention as applied to the preferred embodiments, it will be understood that various omissions and substitutions and changes of the form and details of the device illustrated and in their operation may be made by those skilled in the art, without departing from the spirit of the invention.

The embodiments of the invention in which an exclusive property or privilege is claimed are defined as follows:

I claim:

1. A sealing ring to prevent the entrance of moisture into an electrical enclosure at a coupling with an electrical connector comprising; a rigid outer ring having a sidewall of a predetermined wall height; said sidewall terminating at a first edge thereof in an inwardly extending portion and a downwardly extending portion inclined towards said sidewall to provide a partially enclosed cavity between a portion of said sidewall, said inwardly extending portion and said downwardly extending portion; said outer ring having an outside diameter proportioned to place at least a part of said inwardly extending portion between the wall of an electrical enclosure and the body of an electrical connector to be coupled thereto; an inner ring fabricated from a flexible material, positioned within said outer ring and filling said partially enclosed cavity to prevent separation of said inner and outer rings; said inner ring having a height greater than said predetermined wall height and extending beyond said sidewall of said outer ring at both edges thereof and beyond said inwardly and downwardly extending portions into the aperture within said outer ring; said inner ring providing a seal about said electrical connector as said electrical connector is tightened to said electrical enclosure and said wall of said outer ring preventing overtightening and destruction of said inner ring by maintaining a predetermined spacing between said electrical enclosure and said electrical connector equal to said predetermined height of said outer ring wall.

UNITED STATES PATENT OFFICE
CERTIFICATE OF CORRECTION

Patent No. 3,575,429          Dated April 20, 1971

Inventor(s) Thomas G. Spofford

It is certified that error appears in the above-identified patent and that said Letters Patent are hereby corrected as shown below:

Column 1, line 6, "The Thomas & Betts Co." should be -- Thomas & Betts Corporation --.

Signed and sealed this 24th day of August 1971.

(SEAL)
Attest:

EDWARD M. FLETCHER, JR.          WILLIAM E. SCHUYLER, JR.
Attesting Officer          Commissioner of Patents